United States Patent [19]

Nimberger

[11] Patent Number: 5,090,438
[45] Date of Patent: Feb. 25, 1992

[54] SELF-RELIEVING FLUID REGULATOR

[76] Inventor: Spencer M. Nimberger, 13711 Chelwood Pl., Houston, Tex. 77069

[21] Appl. No.: 586,221

[22] Filed: Sep. 21, 1990

[51] Int. Cl.$^5$ ............................................. G05D 16/10
[52] U.S. Cl. .................................... 137/116.5; 137/549
[58] Field of Search ......................... 137/116.5, 549, 85

[56] References Cited

U.S. PATENT DOCUMENTS

| | | | |
|---|---|---|---|
| 2,981,280 | 4/1961 | Cornelius | 137/116.5 X |
| 3,064,670 | 11/1962 | Peras | 137/116.5 |
| 3,656,497 | 4/1972 | Brown | 137/116.5 |
| 4,111,222 | 9/1978 | Hassell | 137/116.5 X |

OTHER PUBLICATIONS

Two-Page brochure entitled "LPR-2 Light Liquid Hydrocarbon Sampler", by Y-Z Industries, Inc. dated 1/15/86.
Advertisement entitled "Filter/Regulator"-Part No. 30-0100 (undated).

Primary Examiner—Alan Cohan
Attorney, Agent, or Firm—Browning, Bushman, Anderson & Brookhart

[57] ABSTRACT

An improved fluid regulator is provided for receiving high pressure fluid and controllably outputting low pressure fluid. The regulator valve mechanism includes a regulator seat fixed to the regulator body and a regulator valve disk movable within the regulator body for sealing engagement with the seat. A spring-biased piston is provided axially movable within a piston housing in response to the low pressure fluid, and has a port therethrough. A relieving valve mechanism includes a seat formed on the regulator valve disk, and a dart member carried by the piston and having a flow passageway therethrough in fluid communication with the port in the piston. The regulator of the present invention is self relieving to ensure that pressurized fluid will continually be supplied to downstream equipment. The sensitivity of the regulator is enhanced, and the regulator is designed for low cost maintenance.

20 Claims, 2 Drawing Sheets

SELF-RELIEVING FLUID REGULATOR

BACKGROUND OF THE INVENTION

1. Field of the Invention

The present invention relates to fluid regulators of the type which typically reduce a high fluid pressure to a lower downstream pressure suitable for operating fluid-driven tools or equipment. More particularly, the present invention relates to a relieving-type fluid regulator which allows high fluid pressure to be vented from the regulator if the regulator seal should leak.

2. Description of the Background

Fluid regulators are used in various industries to controllably regulate downstream fluid pressure to equipment or tools powered from a relatively high pressure fluid line. Pneumatic regulators are generally classified as being either of the non-relieving or the relieving type. In the former case, the user is generally not concerned with detecting regulator failure, and may not want the regulator to continually vent high pressure if the regulator seal should fail. A non-relieving regulator is thus commonly used in an assembly facility to operate a pneumatically driven motor. If the regulator seal fails, a diaphragm within the regulator typically ruptures and high pressure fluid will briefly be vented to the atmosphere, causing the regulator to at least substantially restrict further fluid flow past the regulator. The operator of the drill motor readily observes this condition, turns off the valve upstream of the regulator, and replaces the regulator.

In a non-relieving regulator, a leak of the regulator valve allows the high pressure fluid to intentionally leak from the regulator rather than blowing out the regulator diaphragm, thereby allowing the regulator to continue operation at approximately the originally set pressure. Accordingly, this type of regulator has a significantly reduced failure rate, and is frequently used in situations where one is not primarily concerned if high pressure fluid vents from the regulator, but rather is primarily concerned that low pressure fluid will continue to be supplied to a downstream tool or equipment even if the regulator seal fails. A relieving type regulator may thus be employed to supply reduced pressure to a sampling pump which is infrequently checked by an operator. It is critical to the operation of the sampling system that low pressure fluid continue to be available to operate the sampling pump even if the regulator seal fails, and a relieving-type regulator satisfies this requirement.

A non-relieving regulator may be easily adjusted to increase the downstream pressure, for example from 50 psi to 60 psi, although a non-relieving regulator typically cannot be easily adjusted to decrease the downstream pressure, e.g. from 60 psi to 50 psi. In order to adequately lower the downstream pressure, an operator must let that air out or otherwise partially bleed the system downstream from the regulator. In a relieving regulator, an operator can either increase or decrease the downstream pressure without otherwise bleeding air from the downstream system.

A significant problem with prior art relieving-type regulators concerns their generally poor sensitivity. Regulator sensitivity is generally defined as the ability of a regulator to incrementally control downstream pressure, coupled with its ability to maintain the set downstream pressure with a change in the high pressure supplied to the regulator. Prior art regulators generally suffer from poor sensitivity in that an operator is not able to incrementally adjust the downstream pressure, e.g. from 50 psi to 52 psi, and the adjusted downstream pressure of 52 psi cannot be continually maintained at that level if the upstream pressure varies from 1,000 psi to 1,200 psi. In order to allow such fluid regulators to be sufficiently sensitive, the effective diameter of the regulator diaphragm conventionally is closely maximized compared with the diameter of the valve member or dart which seals with the regulator seat. Moreover, the surface finishes for components of prior art relieving-type regulators is critical, and thus the regulators are expensive to manufacture and costly to maintain. An exemplary prior art relieving-type air regulator is available under Part No. 30-0100 from YZ Industries.

The disadvantages of the prior art are overcome by the present invention, and an improved relieving-type fluid regulator is hereinafter disclosed which may be inexpensively manufactured and maintained compared to prior art relieving-type regulators.

SUMMARY OF THE INVENTION

An automatically relieving fluid regulator of the present invention offers high reliability at a lower overall cost. The regulator does not fail if the regulator valve should leak, and may thus be used to supply reduced fluid pressure to fluid sampling systems or other equipment whose operation is essential. High regulator sensitivity is achieved, component part finishes are not critical, and the regulator may be easily serviced and repaired.

The regulator valve mechanism is functionally combined with the relieving valve mechanism. A tubular dart is fixed to a piston responsive to the downstream fluid pressure level. The conical-shaped lower end of the dart is adapted for sealing engagement with a spring-biased disk having a similarly shaped seat therein. When low pressure fluid is not used, the regulator body seals with the disk to prevent high pressure fluid from passing to the downstream low pressure system, while the lower end of the dart seals with the same disk to prevent bleeding of high pressure fluid through the dart and past the piston. When low pressure fluid is required, the reduced pressure on the piston allows the piston spring to force the dart against the disk to break the regulator body/disk seat, but not the dart/disk seat, thereby increasing the pressure in the low pressure system.

If the regulator body/disk seal should leak, increased fluid pressure in the downstream system will force the piston upward against the piston spring, thereby unseating the dart/disk seal, but not the regulator body/disk seal. The low pressure fluid is thus relieved through the dart and the piston until the reduced fluid pressure allows the piston spring to again seat the dart with the disk. If the dart/disk seal should leak, the downstream fluid pressure will drop until the dart forces the disk off the regulator body seat to again increase fluid pressure in the downstream system. Low pressure will continually be supplied to the downstream system regardless of leakage past the dart/disk or the regulator body/disk seals. The downstream fluid pressure may be controlled in a conventional manner by adjusting the compression of the piston spring to either increase or decrease downstream pressure.

A simple monolithic disk thus serves as a component of both the pressure relieving valve mechanism and the regulator valve mechanism. The disk serves as a seat to the dart to form the relieving valve mechanism, and as the valve member for the seat on the regulator body to form the regulator valve mechanism. The regulator is designed such that this disk may be easily replaced during normal service. The conical sealing surface between the dart and the disk increases regulator life and reliability. The regulator preferably is provided with a filter mechanism to filter the high pressure fluid prior to entering the valve mechanisms of the regulator.

It is an object of the present invention to provide an improved regulator which reliably supplies low pressure fluid to downstream equipment regardless of leakage past valves within the regulator.

It is another object of the invention that a relatively low cost self-relieving regulator is provided which has comparatively high sensitivity.

Yet a further object of this invention is to provide a relieving-type regulator which has low maintenance cost.

It is a feature of the invention that a spring biased disk is provided within the regulator for forming a pressure relieving seal with a dart or similar member secured to a piston or other low pressure system responsive member, and that the same disk form a seal with a component of the regulator body.

It is also a feature of the invention that the regulator may include a relatively large diameter piston or other system low pressure system responsive member to reduce critical tolerances and finishes and thereby reduce manufacturing costs without adversely affecting regulator sensitivity.

Still another feature of this invention is that the dart has a fluid passageway therethrough for relieving regulator pressure through the dart and past the piston if the regulator seal should leak.

Still another feature of this invention is that regulator reliability is enhanced by providing a dart/disk seal which has a conical configuration.

It is a significant advantage of the present invention that the regulator disk is easily replaceable, thereby reducing cost.

It is a further advantage of this invention that the regulator may include a conventional filter assembly to filter the high pressure fluid before contacting the regulator valve mechanisms.

Still another advantage of this invention is that the desired downstream fluid pressure may be controlled by adjusting the regulator in a conventional manner.

These and further objects, features and advantages of the present invention will become apparent from the following detailed description, wherein reference is made to the figures in the accompanying drawings.

BRIEF DESCRIPTIONS OF THE DRAWINGS

DETAILED DESCRIPTION OF PREFERRED EMBODIMENTS

Figure 1:
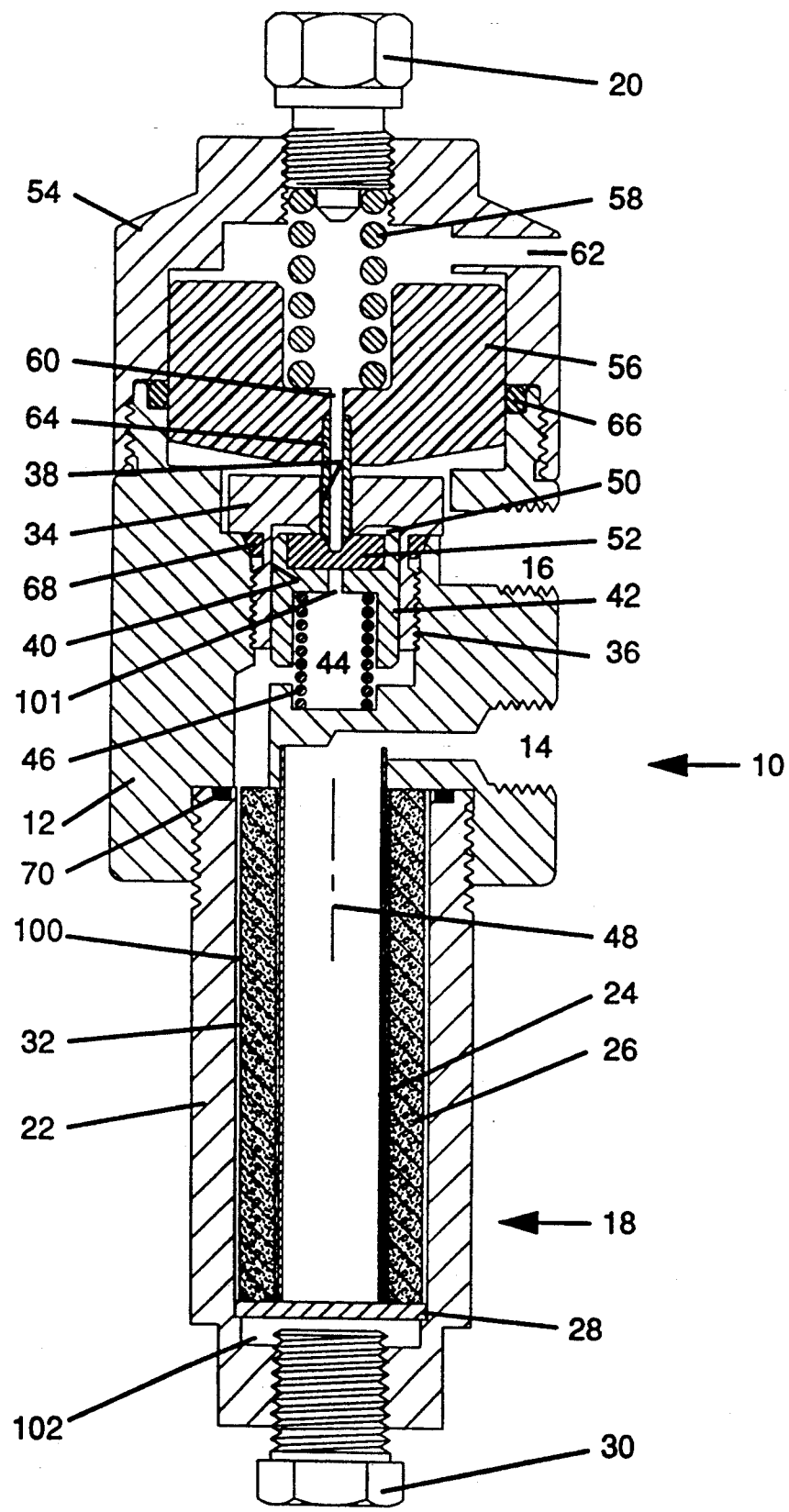
FIG. 1 is a side view, partially in cross-section, of fluid regulator according to the present invention.

FIG. 1 depicts a pneumatic regulator 10 according to the present invention. The body 12 of the regulator includes a threaded high pressure input port 14 and threaded low pressure output port 16, a lower filter assembly 18, and the adjustment knob 20 for selectively regulating the pressure output from the regulator. Although not shown in FIG. 1, it should be understood that a high pressure fluid line, e.g., 1,000 psi to 1,200 psi, conventionally is threadably connected to input port 14, while a low pressure line is similarly connected to port 16. The low pressure line is typically part of a low pressure system which supplies pressure to equipment or tools, such as a sampling pump, with the level of downstream pressure being selectively controlled by adjustment knob 20 to maintain downstream pressure in the range of, e.g., 50 psi to 52 psi.

A lower filter housing 22 is threadably connected to body 12, and houses a cylindrical filter grid 24 and a radially outward filter 26, such that high pressure air entering port 14 passes through grid 24 and filter 26 to remove any contaminants, debris or water which may be in the high pressure line. Filter 26 is preferably of the coalescing type which removes water on the outer filler surface 100. An end plate 28 prevents high pressure air from bypassing the filters yet allows water on the outer surface 100 of the filter to pass down to chamber 102. Removable plug 30 is threaded to the lower housing 22 to facilitate removal of contaminants during service of the regulator. The filter 26 may only be changed infrequently, and may be replaced by unthreading the lower filter housing 22 from the regulator body 12. Filtered air thus passes in the annulus 32 between the housing 22 and the filter 26, and into the regulator body 12.

The regulator body 12 houses a special nut 34 which is threaded at 36 to the body 12. The nut has a small diameter passageway 38 in the head portion of the nut and a larger diameter passageway 40 in the lower portion of the nut. The cylindrical passageway 40 houses and guides a metal carrier disk 42, which in turn forms a cavity 44 for receiving a coiled spring 46 which contacts the body 12 and biases the metal carrier disk 42 upward toward the head portion of the nut 34. The outer configuration of the metal carrier disk 42 may be hexagonal-shaped, and accordingly it should be understood that disk 42 is free to move in the direction of the axis 48 of the regulator, although high pressure fluid passes to the cavity 50 between the nut 34 and the metal component 42. The metal carrier disk 42 also houses a disk member 52, which is press fitted into the disk 42 and thus moves axially therewith.

An upper housing 54 is threadably connected to the regulator body 12, and houses piston 56 therein. Piston 56 is biased downward by piston spring 58, and the compressive force of the spring on the piston is controlled by adjusting knob 20. The piston 56 includes a central through port 60 for relieving fluid from the valve, as explained subsequently, with the fluid passing out vent port 62 in the upper housing 54. Dart member 64 is press fitted into sealing engagement with the piston 56, and is discussed in detail subsequently. O-ring 66 forms both a static seal between the housings 12 and 54, and a dynamic seal with the piston 56. O-rings 68 and 70 provide static seals between the special nut and the body 12, and between the lower filter housing 22 and the body 12, respectively.

Figure 2:
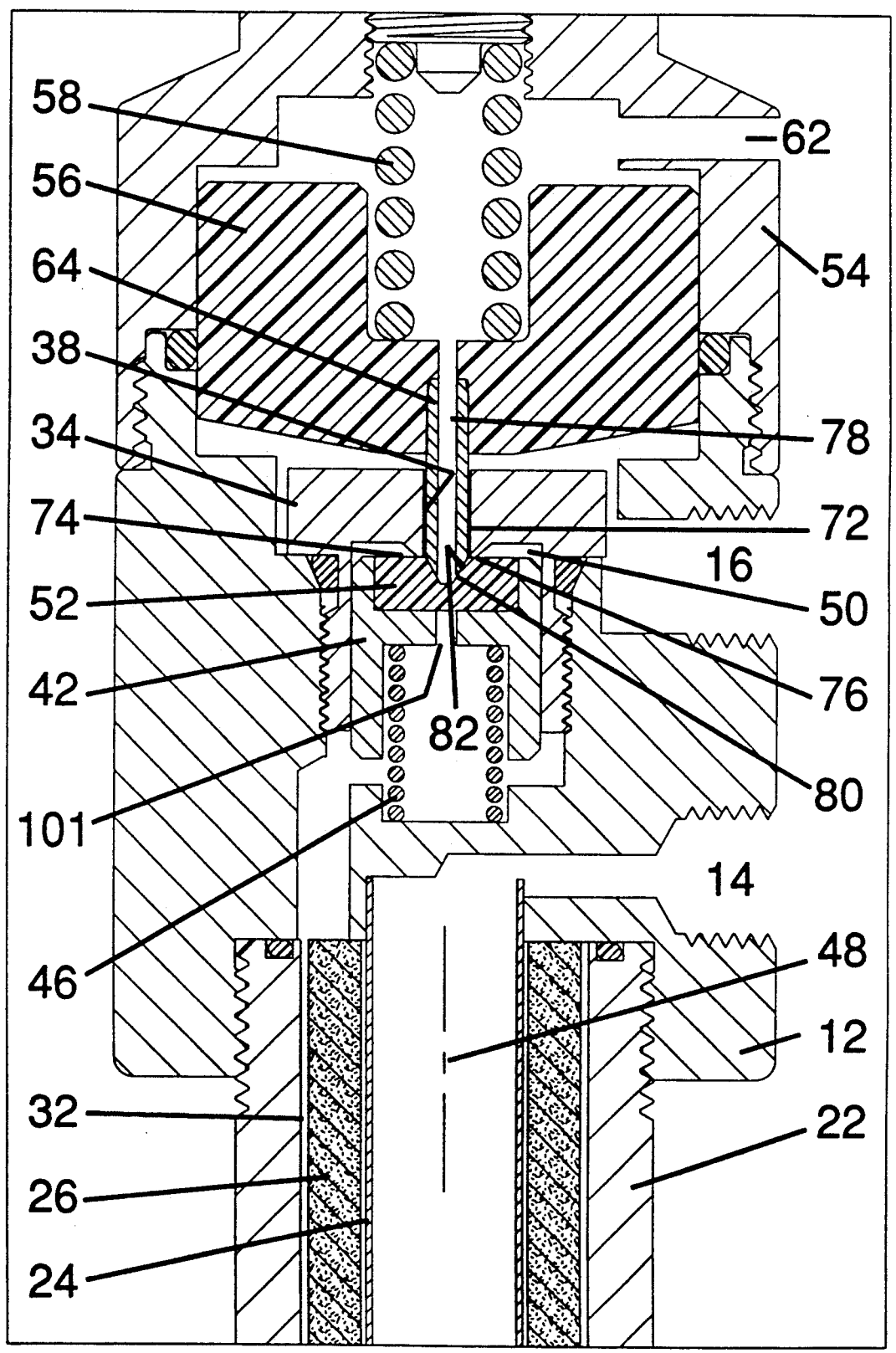
FIG. 2 is a cross-sectional view of a portion of the regulator shown in FIG. 1.

FIG. 2 depicts in greater detail the various components which make up the valve mechanisms for the regulator of the present invention, as well as other components discussed above. As previously explained, high pressure fluid will continually be present in the chamber 50, and annular passageway 72 between the exterior cylindrical surface of dart 64 and the interior cylindrical surface 38 of the nut 34 is continually in fluid communication with the output port 16. The regulator valve mechanism comprises disk 52, which includes planar surface 74 and acts as a valve to seal with seat 76, which surrounds the dart 64 and is functionally stationary with and part of the valve body. High fluid pressure acting on the disk 52 and carrier disk 42 forces the disk 52 upward, in combination with the relatively small upward force of the disk spring 46, and into sealing engagement with the metallic seat 76. When pressure in the downstream port 16 drops below its selected value, the significant downward force of the piston spring 58 overcomes the combination of the reduced upward low pressure force on the piston and the upward force on the disk 52 to force the dart 64 downward and cause the disk 52 to unseat from the seat 76, thereby allowing pressure to bypass the regulator valve mechanism and increase the downstream pressure to lift the piston 56 upward, until a seal is again formed between the disk 52 and the seat 76. Referring again to FIG. 1, if downstream pressure of 50 psi exists and the operator desires 60 psi, the adjustment nut 20 may be threaded downward to increase the compressive force of the piston spring 58, thereby increasing the downstream pressure to its desired value. Similarly, if downstream pressure of 60 psi exists and the operator desires 50 psi, the adjustment nut 20 may be selectively unthreaded to reduce the compressive force of the spring 58. Since the regulator is of the relieving type, downstream pressure may be either increased or decreased without requiring that air be bled from the downstream system.

Referring now to FIG. 2, the dart 64 has a passageway 78 therethrough for relieving pressure from the regulator. The lower end of the dart 64 has a frustoconical valve sealing surface 80, which normally seals with conical sealing surface 82 in the disk 52. If the valve body/disk seal were to leak, the pressure would slowly increase in the downstream system. Before pressure increased considerably above the set pressure, however, the increased pressure would force piston 56 upward, which would cause the dart 64 to unseat surface 80 from the seating surface 82, thereby venting low pressure through the passageway 78 and out port 62 until the lowered pressure at port 16 again caused the piston spring 58 to move the piston 56 downward to seal the dart 64 with the disk 52. Piston 56 has a diameter of at least ten times, and preferably at least twelve times, the diameter of dart 64, so that high sensitivity of the regulator is obtained. If the dart/disk valve mechanism were to leak, pressure within the low pressure system would drop below the selected value, thereby causing piston 56 to automatically move downward and break the regulator seal provided by the member 34 and the disk 52 until high pressure passed by this seal to increase the low pressure value to within its desired range. Thus if either the regulator seal mechanism or the release seal mechanism leaks, or both sealing mechanisms leak, the regulator will vent fluid, although leakage of one or both of these mechanisms does not cause the failure of the regulator and the disruption of fluid to the downstream equipment or tools. Also, the conical configuration of the seal between the dart 64 and the disk 52 substantially enhances the life of this seal.

Referring again to FIG. 1, the upper housing 54 may be easily unthreaded from the body 12 during service of the regulator, with the piston and the interconnected dart 64 removed with the housing 54 due to frictional engagement between the piston and the seal 66. Once the housing 54 has been removed, the member 34 may be easily and quickly unthreaded by providing a screw driver slot (not shown) in its top surface. The carrier disk 42 may then be removed, and seat disk 52 knocked out and replaced. Very low maintenance costs for the regulator are thus anticipated due to the functional characteristics of the valve mechanisms as described herein in the overall design of the regulator.

The component of the regulator as shown in FIG. 1 may be fabricated from various metallic materials, depending primarily on the type of gas to be passed through the regulator and the environment in which the regulator is placed. The filter 26 may be fabricated from various conventional materials in prior art regulators. The piston 56 and the disk 52 are preferably fabricated from a thermoplastic material, such as Delrin, PEEK, or Teflon. The O-ring seals may be fabricated from various rubber or conventional elastomeric materials used to form static or dynamic seals.

Various changes and modifications may be made within the scope of the present invention. The filter assembly 18 need not be provided, or may be provided as a separate component upstream from the regulator. The configuration of the valve and seating surfaces may change from those described, although these components should functionally operate in the manner as described above to achieve the purposes of the present invention. A piston is preferably used as the member responsive to the low fluid pressure level in the downstream system to unseat the dart from the disk and break the pressure relieving valve mechanism, although a diaphragm could be substituted for a piston and the dart 64 connected to the diaphragm.

The foregoing disclosure and description of the regulator are thus illustrative and explanatory of a suitable regulator, and various other changes in the components of the regulator may be made within the scope of the appended claims and without departing from the spirit of the invention.

What is claimed is:

1. A regulator for receiving high pressure fluid and controllably outputting low pressure fluid, the regulator including a regulator body having a high pressure fluid input port and a low pressure fluid output port, and an adjustment member for selectively controlling the level of output low pressure fluid, the regulator further comprising:

a regulator valve mechanism for controlling the flow of fluid from the high pressure fluid input port to the low pressure fluid output port, the regulator valve mechanism including a regulator seat positioned within and carried by the regulator body, and a regulator valve disk movable within the regulator body for sealing engagement with the regulator seat;

a fluid barrier axially movable with respect to the regulator body in response to the level of low pressure fluid, the fluid barrier having a port therethrough;

a biasing device for biasing the fluid barrier toward the regulator valve mechanism; and a relieving valve mechanism for venting fluid from the regulator, the relieving valve mechanism including a seat having a conical configuration formed on the regulator valve disk, and a dart member carried by and in sealing engagement with the fluid barrier, the dart member having a flow passageway therethrough in fluid communication with the port in the fluid barrier, and having a frustoconical sealing surface for sealing engagement with the seat of the relieving valve mechanism.

2. The regulator as defined in claim 1, further comprising:
a disk spring for biasing the regulator valve disk toward the regulator seat.

3. The regulator as defined in claim 1, wherein the regulator seat is fixed to the valve body and limits axially movement of the regulator valve toward the fluid barrier.

4. The regulator as defined in claim 1, wherein the regulator seat is positioned radially outward of the dart member.

5. The regulator as defined in claim 1, wherein the regulator valve disk is a monolithic thermoplastic-material disk.

6. The regulator as defined in claim 1, wherein:
the fluid barrier is a piston having first face exposed to ambient pressure at an opposing second face exposed to low pressure fluid; and
the biasing device is a coil spring acting on the piston.

7. The regulator as defined in claim 6, wherein:
the piston has a diameter of at least ten times the diameter of the dart member.

8. The regulator as defined in claim 1, further comprising:
a filter assembly for filtering high pressure fluid prior to passing through the regulator valve mechanism and relieving valve mechanism.

9. The regulator as defined in claim 8, wherein the filter assembly comprises:
a filter housing removably secured to the regulator body:
a filter within the filter housing; and
a nut threaded to the filter housing for facilitating removal of fluid from within the filter housing without removing the filter housing from the regulator body.

10. A regulator for receiving high pressure fluid and controllably outputting low pressure fluid, comprising:
a regulator body having a high pressure input port and a low pressure fluid output port;
a piston body removably secured to the regulator body;
a regulator valve mechanism for controllably passing high pressure fluid through the regulator valve mechanism to increase the fluid pressure in the low pressure fluid output port, the regulator valve mechanism including a regulator seat affixed to the regulator body, a carrier member, and a regulator valve disk sealingly housed within the carrier member, the carrier member and regulator valve disk being movable within the regulator body for sealing engagement of the regulator valve disk with the regulator seat;
a piston axially movable within the piston body in response to the level of low pressure fluid, the piston having a port therethrough;
a piston spring for acting against the piston and biasing the piston toward the regulator valve mechanism;
an adjustment member extending from the piston body for selectively controlling the force of the piston spring and thereby the level of output low pressure fluid from the regulator;
a relieving valve mechanism for relieving fluid from the regulator, including a seat having a conical configuration formed on the regulator valve disk, and a dart member carried by and in sealing engagement with the piston, the dart member having a flow passageway therethrough in fluid communication with the port in the piston and having a frustoconical sealing surface for sealing engagement with the seat of the relieving valve mechanism.

11. The regulator as defined in claim 10, wherein the regulator seat is positioned radially outward of the dart member.

12. The regulator as defined in claim 10, wherein:
the dart member has frustoconical sealing surface;
the regulator valve disk seat has a conical configuration for sealing engagement with the dart member.

13. The regulator as defined in claim 10, wherein the regulator valve disk is a monolythic thermoplastic-material disk.

14. The regulator as defined in claim 10, further comprising:
a filter assembly for filtering the high pressure fluid prior to passing through the regulator valve mechanism and the relieving valve mechanism, the filter assembly including a filter housing secured to the regulator body, a filter within the filter housing, and a nut threaded to the filter housing for facilitating removal of fluid from the filter housing without disconnecting the filter housing from the regulator body.

15. A pneumatic regulator for receiving high pressure air and controllably outputting low pressure air, comprising:
a regulator body having a high pressure air input port and a low pressure air output port;
a piston housing movably secured to the regulator body;
a regulator valve mechanism for controllably passing high pressure air through the regulator valve mechanism to increase the air pressure in the low pressure air output port, the regulator valve mechanism including a regulator seat carried by the regulator body and a regulator valve disk axially movable within the regulator body for sealing engagement with the regulator seat;
a piston axially movable within the piston body in response to the level of low pressure air, the piston having a port therethrough;
a spring for acting against the piston and biasing the piston toward the regulator valve mechanism;
an adjustment member for selectively controlling the force of the piston spring and thereby the level of output low pressure air from the regulator; and
a relieving valve mechanism for relieving air from the regulator, including a seat having a conical configuration formed on the regulator valve disk, and a dart member carried by and in sealing engagement with the piston, the dart member having a flow passageway therethrough in air communication with the port in the piston and having a frustoconical sealing surface for sealing engagement with the seat of the relieving valve mechanism.

16. The regulator as defined in claim 15, wherein the regulator seat is positioned radially outward of the dart member, and the disk member is a monolithic thermoplastic-material disk.

17. The regulator as defined in claim 15, wherein:
the piston has a diameter of at least ten times the diameter of the dart member.

18. A regulator as defined in claim 1, further comprising:
a nut threadably secured to the regulator body and having an opening therethrough for receiving the dart member, such that the piston body and dart member may be removed from the regulator body, the nut unthreaded from the regulator body, and the disk member replaced during service of the regulator.

19. The regulator as defined in claim 10, wherein: the piston has a diameter of at least 10 times the diameter of the dart member.

20. The regulator as defined in claim 15, further comprising:
a nut threadably secured to the regulator body and having an opening therethrough for receiving the dart member, such that the piston body and dart member may be removed from the regulator body, the nut unthreaded from the regulator body, and the disk member replaced during service of the regulator.

* * * * *

UNITED STATES PATENT AND TRADEMARK OFFICE
CERTIFICATE OF CORRECTION

PATENT NO. : 5,090,438

DATED : February 25, 1992

INVENTOR(S) : Spencer M. Nimberger

It is certified that error appears in the above-identified patent and that said Letters Patent is hereby corrected as shown below:

In Column 8, line 7, change the "." after "mechanism" to --;--, and insert the following:

--a disk spring for biasing the regulator valve disk toward the regulator seat; and a nut threadably secured to the regulator body and having an opening therethrough for receiving the dart member, such that the piston body and dart member may be removed from the regulator body, the nut unthreaded from the regulator body, and the disk member replaced during service of the regulator.--

In Column 8, line 11, Claim 12 should be omitted.

Signed and Sealed this

Twenty-third Day of November, 1993

Attest:

BRUCE LEHMAN

Attesting Officer

Commissioner of Patents and Trademarks